(12) United States Patent
Wan et al.

(10) Patent No.: US 12,345,548 B2
(45) Date of Patent: Jul. 1, 2025

(54) SENSOR AND HEAT EXCHANGER

(71) Applicant: HANGZHOU SANHUA RESEARCH INSTITUTE CO., LTD., Hangzhou (CN)

(72) Inventors: Xia Wan, Hangzhou (CN); Xinkai Lu, Hangzhou (CN); Huanhuan Rao, Hangzhou (CN); Longzhong Huang, Hangzhou (CN); Linjie Huang, Coconut Creek, FL (US)

(73) Assignee: HANGZHOU SANHUA RESEARCH INSTITUTE CO., LTD., Hangzhou (CN)

( * ) Notice: Subject to any disclaimer, the term of this patent is extended or adjusted under 35 U.S.C. 154(b) by 717 days.

(21) Appl. No.: 17/566,043

(22) Filed: Dec. 30, 2021

(65) Prior Publication Data
US 2022/0120592 A1    Apr. 21, 2022

Related U.S. Application Data

(63) Continuation of application No. PCT/CN2020/112298, filed on Aug. 29, 2020.

(30) Foreign Application Priority Data

Aug. 29, 2019   (CN) .......................... 201910810768.8

(51) Int. Cl.
| | |
|---|---|
| *G01D 11/24* | (2006.01) |
| *F28F 27/00* | (2006.01) |
| *G01D 11/30* | (2006.01) |

(52) U.S. Cl.
CPC ............ *G01D 11/245* (2013.01); *F28F 27/00* (2013.01); *G01D 11/30* (2013.01)

(58) Field of Classification Search
CPC ...... G01D 11/245; G01D 11/30; G01D 21/02; F28F 27/00; F28F 19/006; F28D 1/05366
(Continued)

(56) References Cited

U.S. PATENT DOCUMENTS

| | | | |
|---|---|---|---|
| 5,361,030 A * | 11/1994 | Akiyama | ............. G01N 27/023 324/450 |
| 5,386,730 A * | 2/1995 | Ikeda | ................... G01L 19/0672 73/756 |

(Continued)

FOREIGN PATENT DOCUMENTS

| | | | |
|---|---|---|---|
| BR | 102017008927 A2 * | 12/2017 | ............. B25J 11/00 |
| CN | 1208461 A | 2/1999 | |

(Continued)

OTHER PUBLICATIONS

CN 202383124U Machine Translation (Year: 2012).*
CN 201772940U Machine Translation (Year: 2011).*

*Primary Examiner* — Len Tran
*Assistant Examiner* — Gustavo A Hincapie Serna
(74) *Attorney, Agent, or Firm* — Cheng-Ju Chiang (57) ABSTRACT

A sensor includes a housing, a circuit board, and a sensor chip fixed on the circuit board. The housing defines a receiving cavity and a first channel extending through the housing. The first channel communicates with the receiving cavity and an outside of the sensor. The circuit board is at least partially received in the receiving cavity. At least a part of the circuit board is bonded and fixed to the housing by a thermal conductive glue. The sensor chip is adapted for sensing at least one of a humidity signal and a temperature signal of an environment in the receiving cavity. As a result, the monitoring accuracy is relatively improved.

19 Claims, 10 Drawing Sheets

(58) Field of Classification Search
USPC ........................................................ 165/11.1
See application file for complete search history.

(56) References Cited

U.S. PATENT DOCUMENTS

| | | | | |
|---|---|---|---|---|
| 8,702,303 | B2* | 4/2014 | Farago | G01K 1/14 374/57 |
| 8,707,808 | B2* | 4/2014 | Kovacic | G01D 11/245 73/866.5 |
| 9,046,446 | B1* | 6/2015 | Carroll | G01M 17/027 |
| 11,566,958 | B2* | 1/2023 | Patch | F16J 15/104 |
| 12,044,589 | B2* | 7/2024 | Byun | G01L 3/104 |
| 2010/0063445 | A1* | 3/2010 | Sternberg | A61M 39/20 604/404 |
| 2012/0247179 | A1 | 10/2012 | Kerin et al. | |
| 2013/0269419 | A1* | 10/2013 | Etherington | G01D 11/245 73/204.11 |
| 2017/0003154 | A1* | 1/2017 | Mais | G01F 1/6842 |
| 2017/0184355 | A1* | 6/2017 | Wang | F28F 27/02 |
| 2017/0241822 | A1* | 8/2017 | Wong | G01D 4/02 |
| 2018/0177064 | A1* | 6/2018 | Van Pol | G01M 3/246 |
| 2018/0195924 | A1* | 7/2018 | Patch | G01L 19/147 |
| 2019/0137306 | A1* | 5/2019 | Keith | G01D 9/005 |
| 2020/0132644 | A1* | 4/2020 | Micalizzi | H04Q 9/00 |
| 2020/0187357 | A1* | 6/2020 | Park | G01N 15/1459 |
| 2020/0191886 | A1* | 6/2020 | Suga | G01R 33/077 |
| 2021/0055139 | A1* | 2/2021 | Braun | G01K 1/08 |
| 2021/0116319 | A1* | 4/2021 | Kanazawa | G01L 19/0092 |
| 2021/0381773 | A1* | 12/2021 | Schlam | F28C 3/08 |

FOREIGN PATENT DOCUMENTS

| | | | | |
|---|---|---|---|---|
| CN | 1942743 | A | | 4/2007 |
| CN | 101225272 | A | | 7/2008 |
| CN | 101761976 | A | | 6/2010 |
| CN | 101849173 | A | | 9/2010 |
| CN | 201772940 | U | * | 3/2011 |
| CN | 202383124 | U | * | 8/2012 |
| CN | 202885994 | U | | 4/2013 |
| CN | 103225865 | A | | 7/2013 |
| CN | 203404868 | U | | 1/2014 |
| CN | 104048548 | A | | 9/2014 |
| CN | 104533761 | A | | 4/2015 |
| CN | 104884892 | A | | 9/2015 |
| CN | 105745521 | A | * | 7/2016 ........... G01D 11/245 |
| CN | 205803958 | U | | 12/2016 |
| CN | 106352396 | A | | 1/2017 |
| CN | 106773970 | A | * | 5/2017 |
| CN | 107389136 | A | * | 11/2017 |
| CN | 108088588 | A | | 5/2018 |
| CN | 108955777 | A | * | 12/2018 ............. G01D 11/00 |
| CN | 208187567 | U | | 12/2018 |
| CN | 208227554 | U | | 12/2018 |
| CN | 208282860 | U | | 12/2018 |
| CN | 111750921 | A | * | 10/2020 |
| JP | H6-174344 | A | | 6/1994 |
| JP | 2004-162994 | A | | 6/2004 |
| JP | 2005-214738 | A | | 8/2005 |
| JP | 2005-326367 | A | | 11/2005 |
| JP | 2005-345015 | A | | 12/2005 |
| JP | 2006-17406 | A | | 1/2006 |
| JP | 2016-33430 | A | | 3/2016 |
| KR | 10-2017-0002995 | A | | 1/2017 |
| WO | 2021/037253 | A1 | | 3/2021 |

* cited by examiner

SENSOR AND HEAT EXCHANGER

CROSS-REFERENCE TO RELATED APPLICATIONS

This application is a bypass continuation of National Phase conversion of International (PCT) Patent Application No. PCT/CN2020/112298, filed on Aug. 29, 2020, which further requires priority of a Chinese Patent Application No. 201910810768.8, filed on Aug. 29, 2019 and titled "SENSOR, HEAT EXCHANGER AND HEAT EXCHANGE SYSTEM", the entire content of which is incorporated into this application herein by reference.

TECHNICAL FIELD

The present disclosure relates to a field of sensors, in particular, to sensors and heat exchangers.

BACKGROUND

Frosting of a heat exchanger will cause heat transfer coefficient of the heat exchanger to decrease, and air ducts between the fins will be blocked so as to reduce the air volume, which directly affects the heat exchange efficiency of the heat exchanger of the heat pump system and the pressure drop on the air side. Therefore, it is necessary to detect the frosting of the heat exchanger. In related technologies, a temperature and humidity sensor is used to detect the temperature and humidity of the heat exchanger. However, the measurement accuracy of the sensors in the related art still needs to be improved.

SUMMARY

According to one aspect of the present disclosure, a sensor is provided. The sensor includes a housing, a circuit board, and a sensor chip fixed on the circuit board;
- wherein a material of the housing is metal, the housing defines a receiving cavity and a first channel extending through the housing, and the first channel is in fluid communication with the receiving cavity and an outside of the sensor;
- wherein the circuit board is at least partially received in the receiving cavity, and at least a part of the circuit board is bonded and fixed to the housing by thermal conductive glue; and
- wherein the sensor chip is adapted for sensing at least one of a humidity signal and a temperature signal of an environment in the receiving cavity.

In the present disclosure, the housing of the sensor is made of metal. At least a part of the circuit board is bonded and fixed to the housing through the thermal conductive glue. This is beneficial to transfer the environment temperature sensed by the metal housing to the circuit board through the thermal conductive glue, so that the environment temperature where the sensor chip is located is close to the temperature of the housing. The first channel is conducive to the communication between the air in the receiving cavity and the air outside the sensor. Correspondingly, it is more beneficial to ensure that the temperature and humidity environment where the sensor chip is located is closer to the surface temperature and humidity environment of an object to be detected, thereby improving the accuracy of the corresponding detection signal of the sensor chip.

According to another aspect of the present disclosure, a heat exchanger is provided and includes the above-mentioned sensor. The heat exchanger is a multi-channel heat exchanger or a tube-fin heat exchanger. The sensor is fixed on an outer surface of the heat exchanger and the sensor is in contact with at least a part of the outer surface of the heat exchanger. The surface temperature of the heat exchanger sensed by the metal housing can be transferred to the circuit board through the thermal conductive glue, so that the temperature of the environment where the sensor chip is located is close to the temperature of the housing. The first channel is conducive to the communication between the air in the receiving cavity and the air outside the sensor. Correspondingly, it is more beneficial to ensure that the temperature and humidity environment where the sensor chip is located is closer to the surface temperature and humidity environment of the heat exchanger, thereby improving the accuracy of the corresponding detection signal of the sensor chip.

REFERENCE SIGNS sensor 10, 20;
heat exchanger 100;
heat exchange tube 20, 21, 22; first end of the heat exchange tube 211, 212; second end 212, 221;
fin 30; wave crest portion 31; wave trough portion 32; side wall 33;
heat exchange system 1000; compressor 1; first sensor 2; throttling device 3; second sensor 4; reversing device 5.

DETAILED DESCRIPTION

The exemplary embodiments will be described in detail here, and examples thereof are shown in the drawings. When the following description refers to the drawings, unless otherwise indicated, the same numbers in different drawings indicate the same or similar elements. The implementation embodiments described in the following exemplary embodiments do not represent all implementation embodiments consistent with the present disclosure. On the contrary, they are merely examples of devices and methods consistent with some aspects of the present disclosure as detailed in the appended claims.

The terms used in the present disclosure are only for the purpose of describing specific embodiments, and are not intended to limit the present disclosure. In the description of the present disclosure, it should be understood that the terms "center", "longitudinal", "transverse", "length", "width", "thickness", "upper", "lower", "front", ""rear", "left", "right", "vertical", "horizontal", "top", "bottom", "inner", "outer", "clockwise", "counterclockwise" and other directions or positional relationships are based on the positions or positional relationships shown in the drawings, and are only for the convenience of describing the disclosure and simplifying the description. It does not indicate or imply that the pointed devices or elements must have specific orientations, be constructed and operated in specific orientations, thereby it cannot be understood as a limitation of the present disclosure. In addition, the terms "first" and "second" are only used for descriptive purposes, and cannot be understood as indicating or implying relative importance or implicitly indicating the number of indicated technical features. Thus, the features defined with "first" and "second" may explicitly or implicitly include one or more of these features. In the description of the present disclosure, "a plurality of" means two or more than two, unless otherwise specifically defined.

In the description of the present disclosure, it should be noted that, unless otherwise clearly specified and limited, the terms "installation", "connected" and "connection" should be understood in a broad meaning. For example, it can be a fixed connection, a detachable connection or an integral connection; it can be a mechanical connection or an electrical connection; it can be directly connected or indirectly connected through an intermediate medium, including the connection between two internal elements or the interaction between two elements. For those of ordinary skill in the art, the specific meanings of the above-mentioned terms in the present disclosure can be understood according to specific circumstances.

In the present disclosure, unless otherwise clearly defined and limited, a first feature located "upper" or "lower" of a second feature may include the first feature and the second feature are in direct contact with each other, or may include the first feature and the second feature are in direct contact but through other features therebetween. Moreover, the first feature located "above", "over" or "on top of" the second feature includes the first feature is directly above and obliquely above the second feature, or it simply means that the level of the first feature is higher than that of the second feature. The first feature located "below", "under" and "at bottom of" the second feature includes the first feature is directly below and obliquely below the second feature, or it simply means that the level of the first feature is lower than the second feature. The exemplary embodiments of the present disclosure will be described in detail below with reference to the drawings. In the case of no conflict, the following embodiments and features in the embodiments can be mutually supplemented or combined with each other.

The terms used in the present disclosure are only for the purpose of describing specific embodiments, and are not intended to limit the present disclosure. The singular forms of "a", "said" and "the" described in the present disclosure and appended claims are also intended to include plural forms, unless the context clearly indicates otherwise.

The exemplary embodiments of the present disclosure will be described in detail below with reference to the drawings. In the case of no conflict, the following embodiments and features in the embodiments can be combined with each other.

When heating in winter, the temperature of an outdoor heat exchanger is always lower than the environment air temperature. When it is lower than the dew point temperature of the environment air, condensed water is generated on surfaces of fins of the heat exchanger. When the temperature of the heat exchanger is further below 0° C., the condensed water turns into frost and adheres to the surfaces of the fins. When the frost is severe, the air ducts between the fins are partially or completely occupied by the frost. This will cause the heat transfer coefficient of the heat exchanger to decrease, and the air duct between the fins is blocked, which reduces the air volume. This directly affects the heat exchange efficiency of the heat exchanger of a heat pump system and the pressure drop on the air side. Therefore, because there is a possibility of frosting on the surface of the heat exchanger, the accuracy of monitoring frosting needs to be improved, so that it is beneficial to take measures to avoid frosting in advance to maintain the heat exchange efficiency of the heat pump air conditioning system.

In order to monitor the frosting of the heat exchanger, some related technologies use a temperature sensor to determine whether the heat exchanger is frosted based on 0° C. However, there is an error in this way of determining whether the frost is formed by using the temperature signal. For example, the humidity in the Yangtze River Basin is high. Although the environment temperature T>0° C., the surface of the heat exchanger has been frosted. The northern area is dry and has the low humidity. Although the temperature T<0° C., there is no frost on the surface of the heat exchanger. There are also some related technologies that use dew point temperature to determine whether frost is formed, which requires temperature and humidity sensors to detect environment temperature and humidity, and calculates the dew point temperature. At the same time, the temperature of the heat exchanger is detected and compared with the dew point temperature to determine whether the heat exchanger has frost. This calculation method is more complicated. According to the Regnault principle, when a certain volume of the humid air is uniformly cooled under a constant total pressure, until the water vapor in the air reaches a saturated state, and this state is called the dew point. In other words, if you put a smooth metal surface in the air with a relative humidity lower than 100% and let it cool, when the temperature drops to a certain value, the relative humidity near the surface reaches 100%, and there will be dew (or frost) forms on the surface. The sensor used for the heat exchanger in the related art detects the temperature and humidity in the environment, and cannot accurately reflect the surface temperature and humidity of the heat exchanger. In fact, the surface temperature of the heat exchanger is lower than the environment temperature, and the humidity on the surface of the heat exchanger is greater than the environment humidity. When the humidity sensor detects that the humidity is close to 100%, frost has formed on the surface of the heat exchanger.

The sensor of the embodiment of the present disclosure adopts a metal housing with good thermal conductivity, a ceramic circuit board such as aluminum nitride, and a thermal conductive sealant, so that the temperature of the housing and the temperature of the ceramic circuit board can be close to the surface temperature of the heat exchanger. Therefore, the humidity sensor on the circuit board can detect the relative humidity of the surface of the sensor more accurately. There is no need to calculate the dew point temperature. When the humidity sensor detects that the current humidity signal is close to 100%, it indicates that the surface humidity (RH) of the heat exchanger is also close to 100%, so the surface of the heat exchanger will be frosted. By sending frosting information and controlling it, frosting on the surface of the sensor can be delayed.

Embodiments of the present disclosure provide sensors that can relatively improve the accuracy of temperature and/or humidity monitoring. The use of the sensor in conjunction with the heat exchanger can improve the accuracy of temperature and/or humidity monitoring on or near the surface of the heat exchanger. When the heat exchanger cooperates with the sensor and is used in the operation of the heat exchange system, the accuracy of monitoring frost or fog on the surface of the sensor can be relatively improved. It is easy to understand that in addition to being used in heat exchangers and heat pump systems, these sensors can also be used in other occasions where temperature and/or humidity need to be monitored. There is no limitation here.

Figure 1:
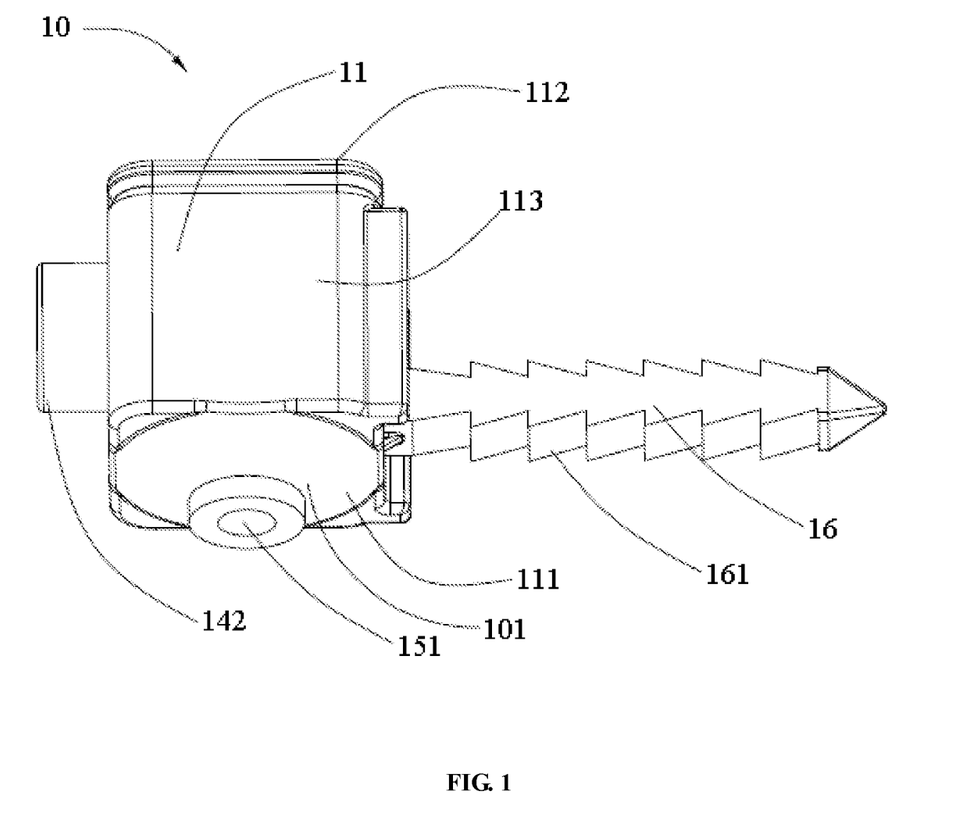
FIG. 1 is a schematic structural view of a sensor in accordance with an embodiment of the present disclosure.
Figure 2:
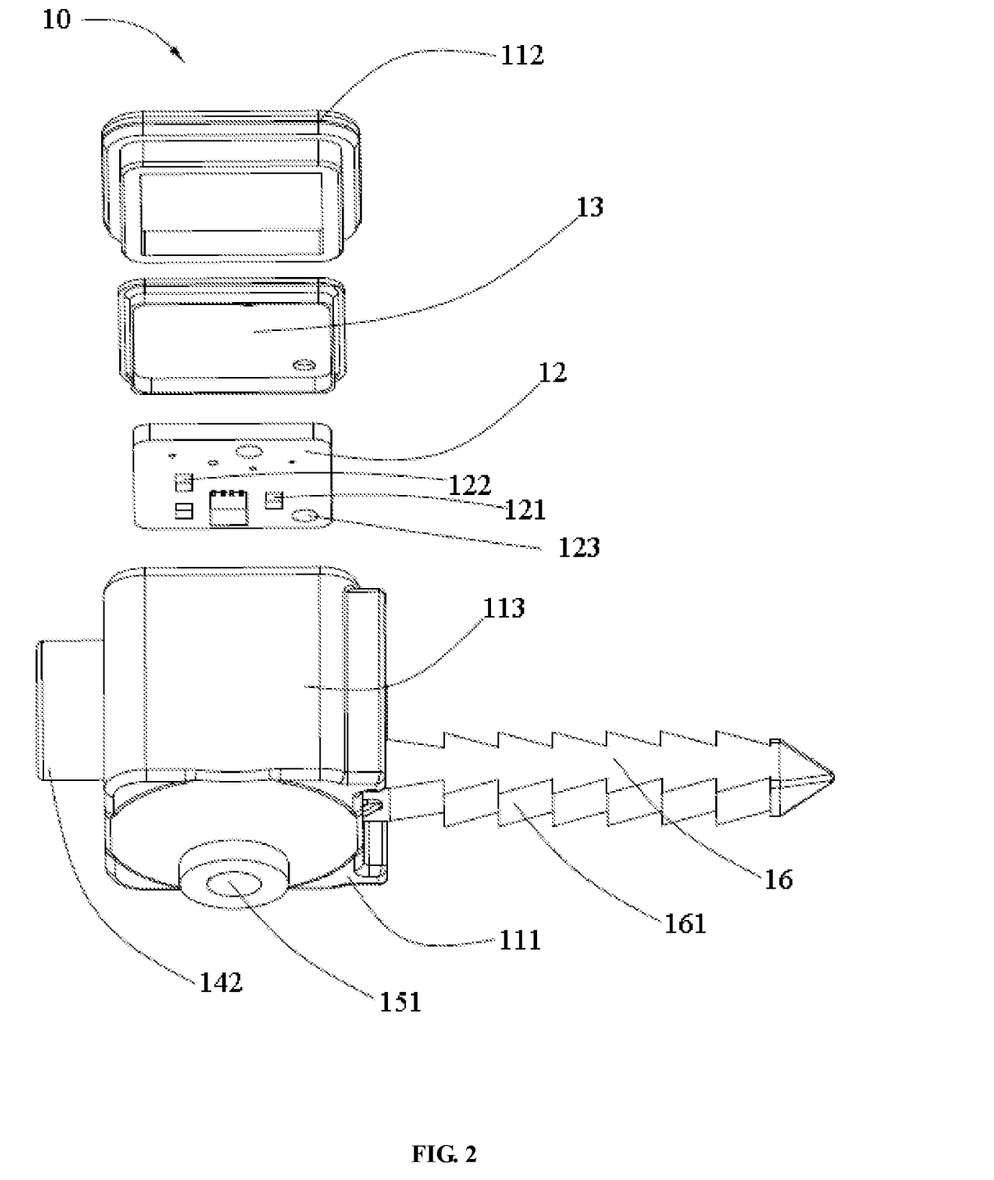
FIG. 2 is a schematic view of an exploded structure of the sensor in the embodiment of the present disclosure shown in FIG. 1.

As shown in FIG. 1 and FIG. 2, specific embodiments of the sensor 10 of the present disclosure will be described in conjunction with other drawings when necessary. FIG. 1 is a schematic view of a structure of the sensor 10 according to an embodiment of the present disclosure. FIG. 2 is a schematic view of an exploded structure of the sensor 10 in the embodiment of the present disclosure shown in FIG. 1.

As shown in FIG. 1, the sensor 10 includes a housing 11. The housing 11 is a metal housing, which has better thermal conductivity. The housing 11 defines a receiving cavity 110. In some embodiments, the housing 11 includes a bottom wall 111, a top wall 112 and a side wall 113. The top wall 112 and the bottom wall 111 are located at opposite ends in a height direction of the sensor (an X direction in FIG. 9). The side wall 113 connects the top wall 112 and the bottom wall 111. The receiving cavity 110 is formed by enclosing the top wall 112, the bottom wall 111 and the side wall 113. In other words, the top wall 112 and the bottom wall 111 are located at opposite ends of the receiving cavity 110 in the height direction. The side wall 113 is disposed on a peripheral side of the receiving cavity 110, and the side wall 113 is connected to the top wall 112 and the bottom wall 111. It should be noted that the sensor 10 described in the embodiment in FIG. 1 is substantially a cuboid. The bottom wall 111 and the top wall 112 are substantially squares. In some other embodiments, the structure of the sensor 10 may also be a cube, a cylinder, etc., which can be set as required, and there is no limitation here.

As shown in FIG. 2, the sensor 10 includes a circuit board 12. The circuit board 12 is provided with at least one sensor chip 121. The sensor chip 121 can sense at least one of a humidity signal and a temperature signal of the air in the receiving cavity 110.

The circuit board 12 is at least partially received in the receiving cavity 110, and the circuit 12 is fixed to the housing 11. Specifically, the circuit board 12 and the top wall 112 may be bonded and fixed by a thermal conductive glue 13. In some other embodiments, the circuit board 12 is directly or indirectly connected to the side wall 113. The material of a main body of the circuit board 12 may be a ceramic material. The ceramic material can be one or a mixture of aluminum nitride or aluminum oxide.

The thermal conductive glue 13 includes a polymer bonding material and a thermal conductive material, which is prepared by filling the thermal conductive material in the polymer bonding material. Optionally, the thermal conductive material includes one or more of aluminum nitride, boron nitride, silicon nitride, aluminum oxide, magnesium oxide, and silicon oxide. The thermal conductivity of the thermal conductive glue 13 is relatively strong, or in other words, the thermal resistance of the thermal conductive glue 13 is relatively small. With this arrangement, when the sensor 10 is used to test the temperature of the heat exchanger surface, the surface temperature of the heat exchanger can be much closer to the temperature of the sensor. In this embodiment, the circuit board 12 of the sensor 10 and the top wall 112 are connected by the thermal conductive glue 13. In this embodiment, the side wall 113 and the top wall 112 can also be connected by the thermal conductive glue 13 or directly welded.

At least a part of an inner surface 114 of the housing 11 of the sensor 10 is coated with a coating 115. The coating 115 is a hydrophilic coating or a hydrophobic coating. The coating 115 facilitates the drainage of the condensed water in the housing 11. In other words, the condensed water does not condense in the coating area. In other words, the condensed water will not form a hanging wall inside the sensor, thereby avoiding affecting the accuracy of the sensor to measure the surface humidity of the heat exchanger.

Figure 4:
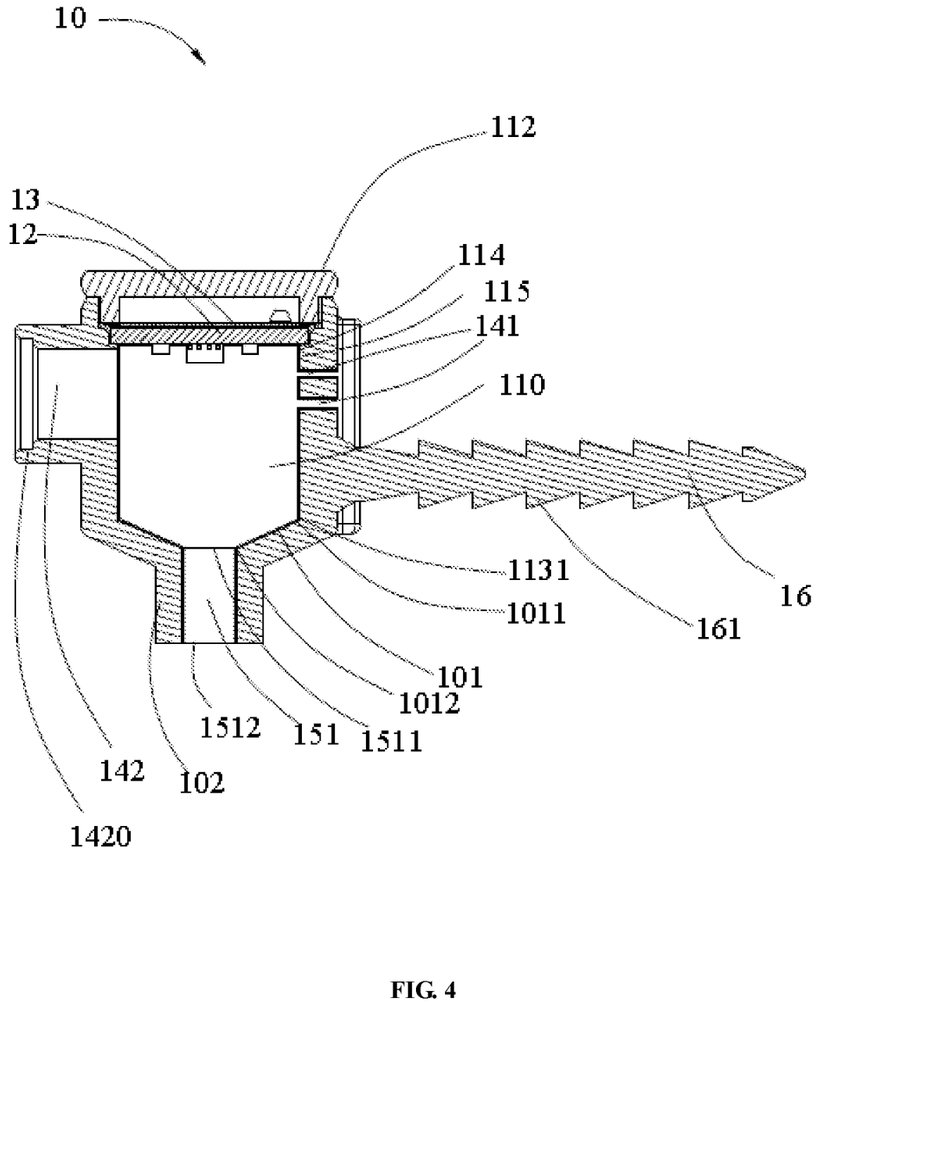
FIG. 4 is a schematic cross-sectional view of the sensor of the embodiment shown in FIG. 3 along the A-A direction.

As shown in FIG. 4, an inner surface of the side wall 113 of the housing 11 of the sensor 10 is all coated with the coating 115. An inner surface of the bottom wall 111 is also coated with the coating 115. With this arrangement, the inner surface 114 of the housing 11 of the sensor 10 facilitates the drainage of the condensed water and facilitates the sensor 10 to measure the humidity on the surface of the heat exchanger or its vicinity.

The sensor 10 defines a first channel 141 which can allow the air to enter and exit. The first channel 141 extends through the side wall 113 or the top wall 112. As shown in FIG. 1 or FIG. 2 in combination with FIG. 3 and FIG. 4, the first channel 141 in this embodiment is located at the side wall 113. The first channel 141 is a through hole. The diameter of the through hole is 0.1 μm to 1 mm. This arrangement facilitates the ingress and egress of the air, and can prevent dust and other debris from entering the receiving cavity 110 of the sensor 10 so as to damage the sensor 10. In theory, the diameter of the through hole is as small as possible. However, due to process and cost constraints, it is sufficient to meet actual needs. In some other embodiments, the diameter of the through hole is 100 nm to 500 μm. In some other embodiments, the first channel 141 may also have other shapes, as long as the need can be achieved, and there is no limitation. The number of the first channels 141 may be one or more than two, as long as the test requirements are met, and it is not limited here.

The sensor 10 defines a third channel 142 which can allow a wire (not shown in the drawings) to enter and exit. The wire is used to electrically connect the sensor 10 and other devices. The detection signal data of the sensor 10 can be imported into other data processing equipment, or data collection equipment, or other equipment through the wire. The third channel 142 extends through the side wall 113 or the top wall 112. The third channel 142 and the first channel 141 are staggered. In other words, the third channel 142 and the first channel 141 are disposed at different positions of the housing 11. In some implementation directions, the axial direction of the third channel 142 may be parallel or coincide with the axial direction of the first channel 141.

As shown in FIGS. 1, 2 and 4, the third channel 142 is formed extending through the side wall 113. There is only one third channel 142, and the third channel 142 and the first channel 141 are disposed on opposite sides of the side wall 113. In some other embodiments, there may be more than two third channels 142, which can be set as required. The third channel 142 may be a through hole. It should be noted that the aperture of the third channel 142 is adapted to the size of the wire passing through it. This arrangement can prevent dust and other debris from entering the receiving cavity 110 of the sensor 10 so as to damage the sensor 10. In some embodiments, a sealant may be used to fix the wire and the housing 11 together in order to prevent the wire from being pulled by an external force and causing the wire to fall off. In other embodiments, the third channel 142 may also overlap with the first channel 141. That is, the air inlet and outlet channels and the wire channel can be the same. It is noted that, in the sensor shown in FIGS. 1 to 8, at least a part of the wall portion 1420 forming the third channel 142 is formed by the side wall 113 extending outwardly in a direction away from the receiving cavity 110. The wall portion 1420 can be used to fix the wire, so that the wire is firmly fixed, and to a certain extent, the wire is prevented from falling off. In some other embodiments, the wall portion 1420 may not be provided.

In some environments with high humidity and low temperature, the condensed water may be generated in the housing of the sensor. If the condensed water cannot be discharged in time, the test results will be inaccurate, and in serious cases, it may even lead to the damage of electronic components so as to damage the sensor. In the present disclosure, the sensor 10 defines a second channel 151 for liquid water discharge. The second channel 151 extends through the bottom wall 111 or the side wall 113. The housing 11 defines a first opening 1511 and a second opening 1512. The second channel 151 is formed between the first opening 1511 and the second opening 1512. One of the first opening 1511 and the second opening 1512 is located on the inner surface of the housing 11, and the other of the first opening 1511 and the second opening 1512 is located on the outer surface of the housing 11. For example, the first opening 1511 is closer to the receiving cavity 110 than the second opening 1512. In addition, the second opening 1512 and the circuit board 12 are located on opposite sides of the first opening 1511, respectively.

In some embodiments, the inner surface of the bottom wall 111 is a straight wall surface. An included angle between the inner surface of the bottom wall 111 and a wall thickness direction of the side wall 113 is recorded as a first included angle. The first included angle is greater than or equal to 0°, and the first included angle is less than 90°. For example, the bottom wall 111 may be in a vertical relationship with the side wall 113. That is, the first included angle between the inner surface of the bottom wall 111 and the thickness direction of the side wall 113 is 0°. The second channel 151 may be located at the middle position of the bottom wall 111. Of course, the inner surface of the bottom wall 111 may have a certain angle with the thickness direction of the side wall 113. That is, the inner surface of the bottom wall 111 may be inclined upwardly or downwardly. In this way, the condensed water can flow along the inner surface of the bottom wall 111 under the action of gravity and finally be discharged from the second channel 151. The second channel 151 is a through hole extending through the bottom wall 111. In some other embodiments, the second channel 151 may be a slit or a gap. There can also be more than two second channels 151, which can be set according to specific needs.

As shown in FIG. 1 or FIG. 2, the housing 11 of the sensor 10 is further provided with a stab portion 16. The stab portion 16 is disposed at the side wall 113. The stab portion 16 is formed to extend outwardly from the side wall 113 in a direction away from the receiving cavity 110. A plurality of saw-tooth portions 161 are provided on the outer periphery of the stab portion 16. The saw-tooth portions 161 can facilitate the use of the sensor 10 in conjunction with other devices, such as a microchannel heat exchanger. Through the saw-tooth portions 161, the sensor can be inserted between the fins of the microchannel heat exchanger and used in cooperation. Of course, the sensor 10 may not be provided with the stab portion 16. The sensor 10 is directly fixed to a position where the temperature or humidity needs to be monitored, which can be set as required.

The exploded schematic view of the sensor 10 as shown in FIG. 2 includes the circuit board 12. The circuit board 12 is provided with a temperature sensor element 121, a humidity sensor element 122 and a filter capacitor 123. The temperature sensor element 121 can sense temperature. The humidity sensor element 122 can sense humidity. The filter capacitor 123 can reduce interference in the temperature or humidity measurement process. In some other embodiments, the circuit board 12 is only provided with the temperature sensor element 121 or the humidity sensor element 122. In other words, the temperature sensor element 121 or the humidity sensor element 122 can be arranged separately or in combination, and there is no limitation here. Optionally, the circuit board 12 is provided with at least one sensor chip which can sense temperature and/or humidity. Optionally, the circuit board is provided with more than two sensor chips which can monitor temperature and/or humidity. The sensing area of the sensor chip is pasted with a waterproof and/or dustproof film. The waterproof and dustproof film can be dustproof and waterproof, so that the measurement accuracy of the sensor is high, and the service life of the sensor can be relatively prolonged. Wherein, the waterproof and dustproof film can be IP67. Optionally, the circuit board includes a filter capacitor which can reduce the noise of monitoring and make the monitoring data more accurate. Optionally, there are a plurality of filter capacitors.

Figure 3:
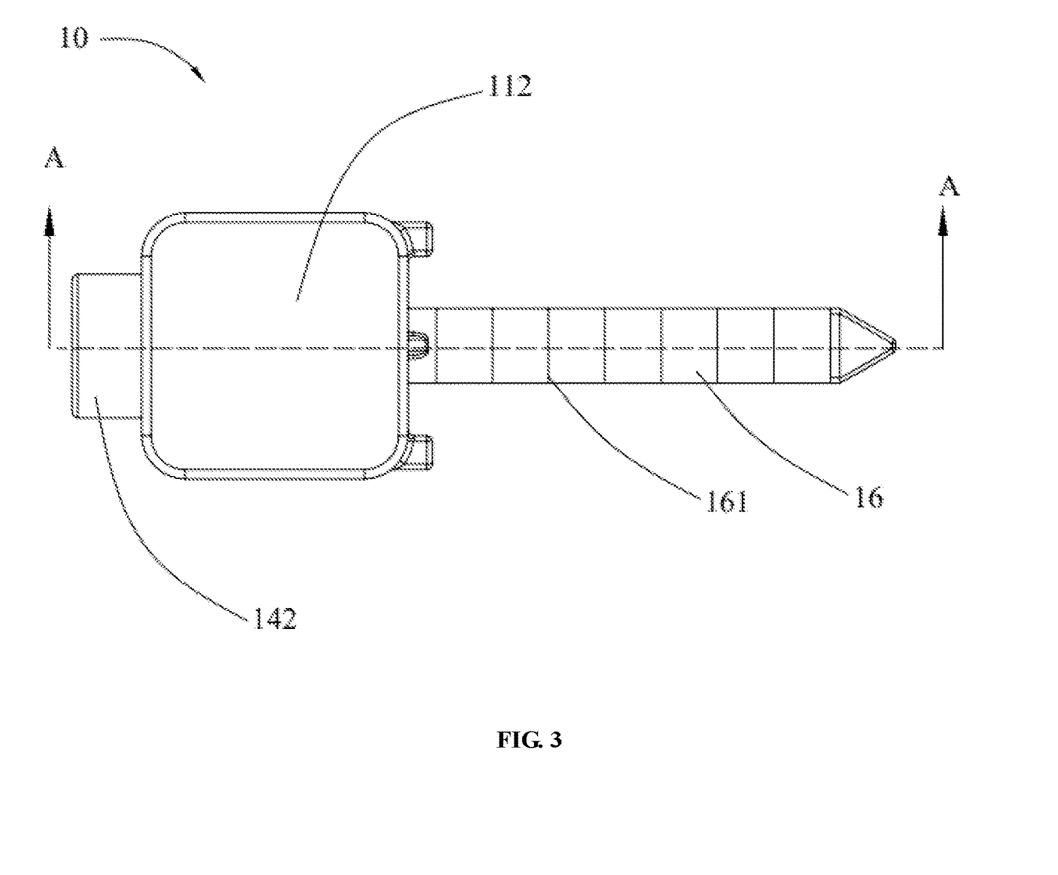
FIG. 3 is a schematic top view of the embodiment of the present disclosure shown in FIG. 2.

FIG. 3 is a schematic top view of the sensor 10 according to an embodiment of the present disclosure in FIG. 2. FIG. 4 is a schematic cross-sectional view of the sensor 10 of the embodiment in FIG. 3 along the A-A direction. As shown in FIGS. 4 and 3, the sensor 10 has the housing 11. The housing 11 has the inner cavity 110, the bottom wall 111, the top wall 112 and the side wall 113. The first channel 141 and the third channel 142 extend through the side wall 113. The sensor 10 also has the stab portion 16 which is disposed on the side wall 113. The stab portion 16 has a plurality of saw-tooth portions 161. The plurality of saw-tooth portions 161 are convex, so that the outer periphery of the stab portion 16 forms saw-teeth with different concavities and convexities. The sensor 10 also includes the circuit board 12. The circuit board 12 is fixed to the top wall 112 by the thermal conductive glue 13. The circuit board 12 is provided with the humidity sensor element 122, the temperature sensor element 121 and the filter capacitor 123. The sensing openings of the humidity sensor element 122 and the temperature sensor element 121 are both face to the inner cavity 110. When the sensor 10 is actually used, the sensing openings of the humidity sensor element 122 and the temperature sensor element 121 may be arranged downwardly. By such arrangement, it is not conducive to adhesion of dust and the like to the sensing area, thereby avoiding affecting the accuracy of the sensor elements. In addition, it is also conducive to the discharge of the condensed water by gravity, which improves the test accuracy, and can extend the life of the sensor elements and the sensor to a certain extent. In some other embodiments, the circuit board 12 may also be disposed on the side wall 113. The sensing opening may not face down completely, as long as it can meet the needs.

As shown in FIG. 4, the second channel 151 is provided on the bottom wall 111. Specifically, all or a part of the bottom wall 111 forms an inclined wall 101. A first end 1011 of the inclined wall 101 is connected to a first end 1131 of the side wall 113. A second end 1012 of the inclined wall 101 is an end extending from the first end 1011 in a direction away from the top wall 112. The bottom wall 111 further includes a matching portion 102. The mating portion 102 protrudes from an end of the inclined wall 101 in a direction away from the top wall 112. The second channel 151 extends through the matching portion 102. The matching portion 102 may be cylindrical, which is convenient for processing and manufacturing. Of course, the bottom wall 111 may not have the matching portion 102. The second end 1012 of the inclined wall 101 enclosing the second channel 151 can also achieve a drainage function. In this way, since the bottom wall 111 is generally funnel-shaped, it is advantageous for the condensed water to drain out of the sensor 10.

In some other embodiments, the bottom wall 111 may also have a part of a straight wall section, that is, a part of the bottom wall 111 is a flat wall section and a part of the bottom wall 111 is an inclined wall 101. The first end 1011 of the inclined wall 101 is connected with the flat wall section of the bottom wall 111. The second end 1012 of the inclined wall 101 extends from the first end 1011 in a direction away from the top wall 112.

Figure 5:
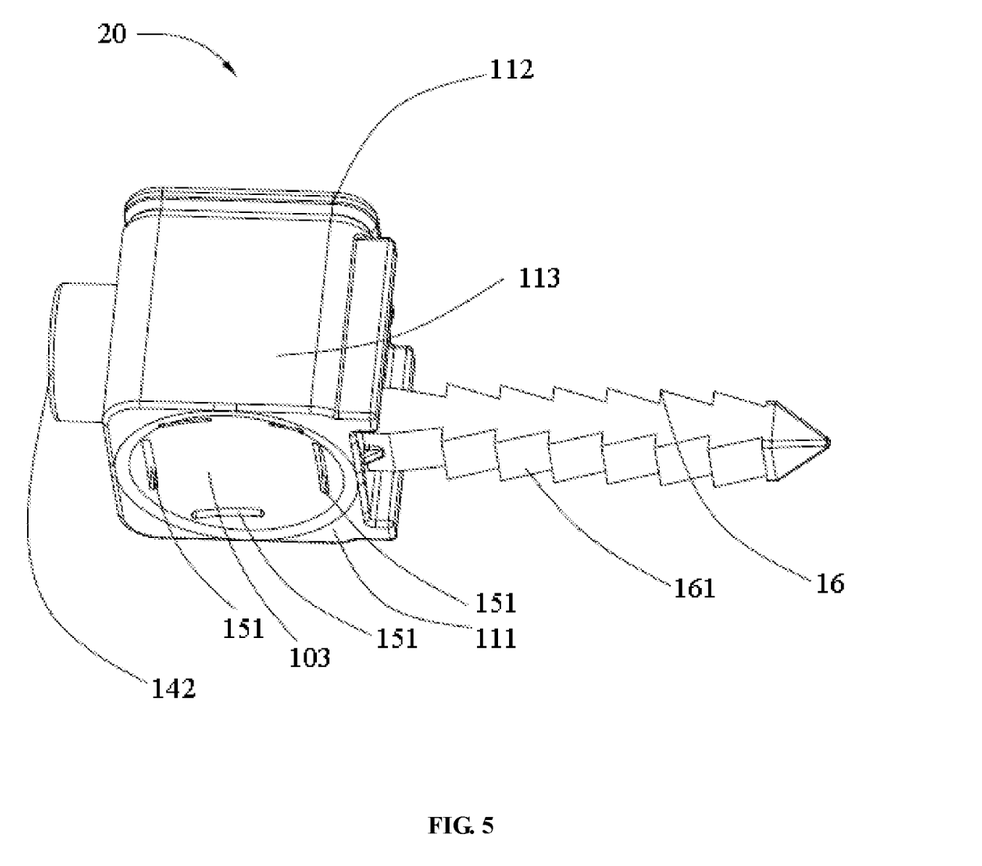
FIG. 5 is a schematic structural view of a housing of the sensor in accordance with another embodiment of the present disclosure.
Figure 6:
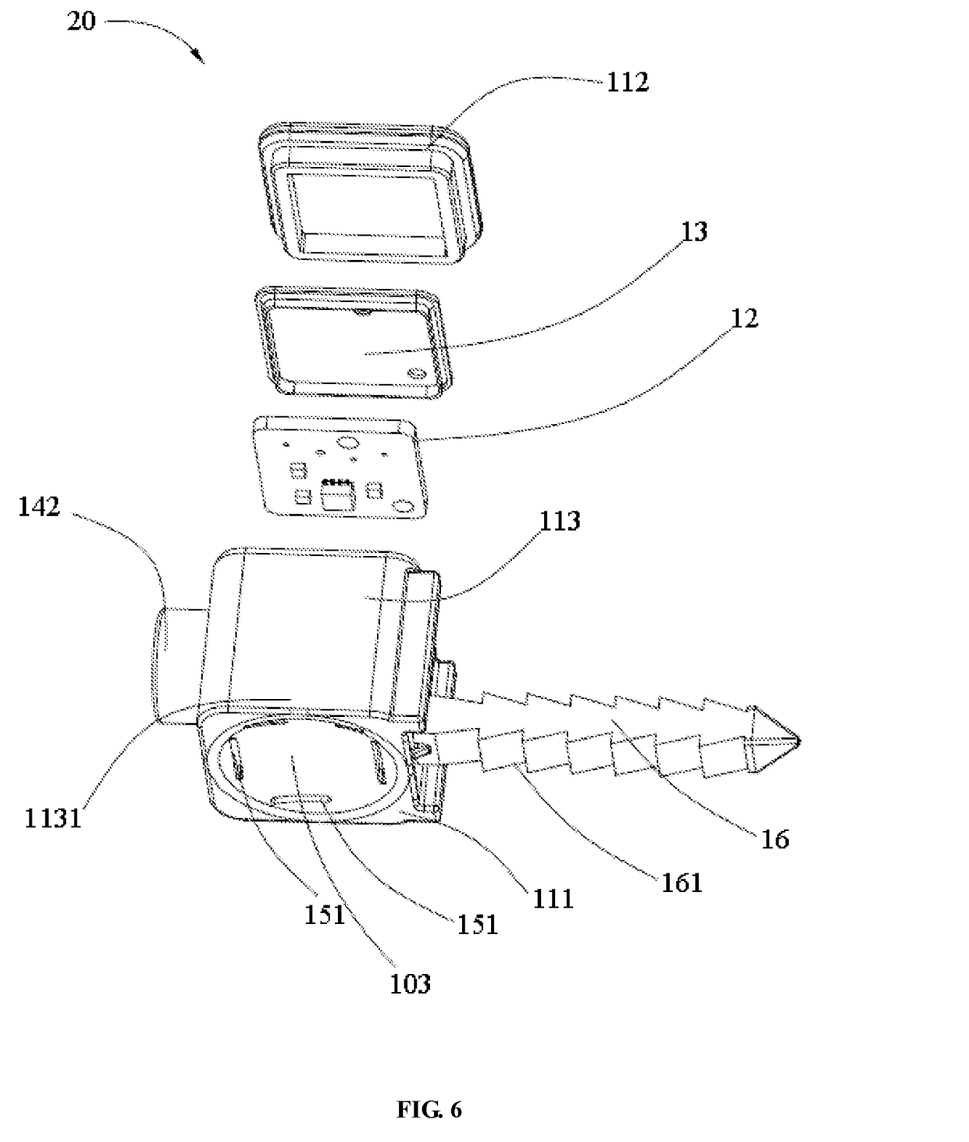
FIG. 6 is a schematic view of an exploded structure of the sensor in the another embodiment of the present disclosure shown in FIG. 5.
Figure 7:
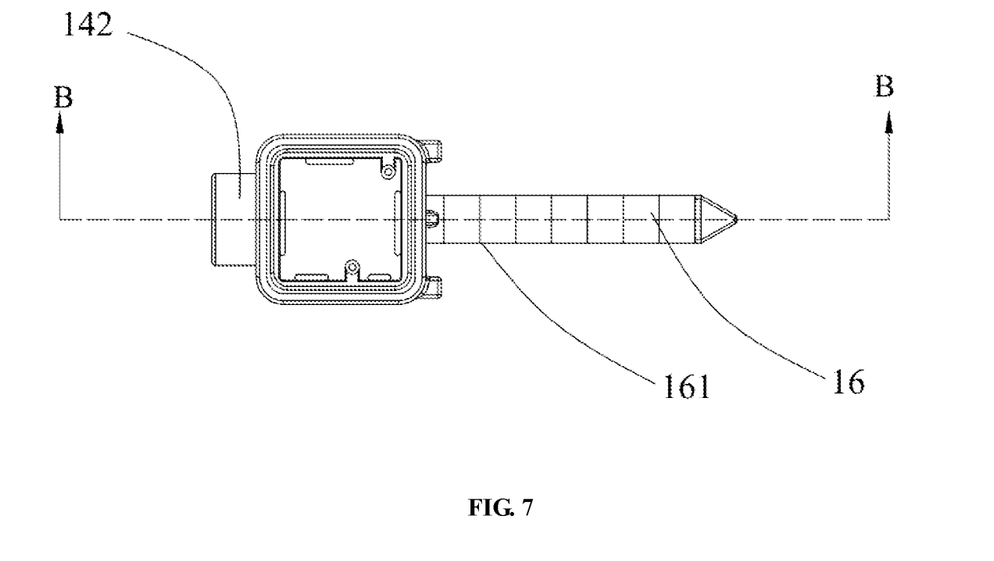
FIG. 7 is a schematic top view of the embodiment of the present disclosure shown in FIG. 6.
Figure 8:
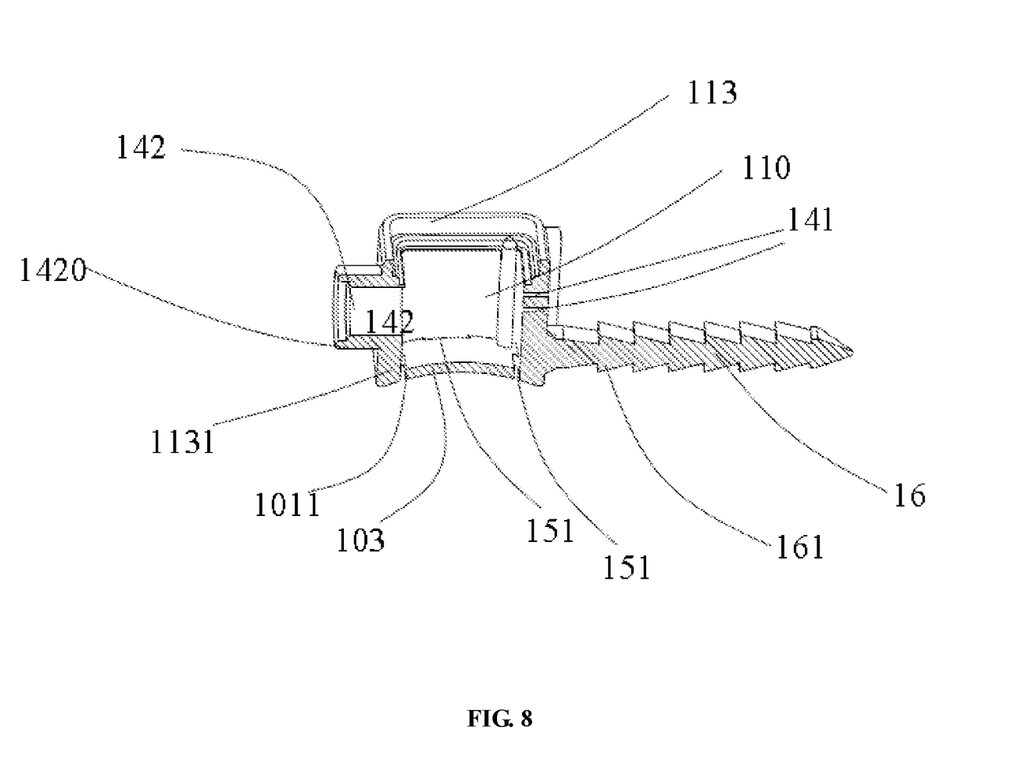
FIG. 8 is a schematic cross-sectional view of the housing of the sensor of the another embodiment shown in FIG. 7 along the B-B direction.

FIG. 5 is a schematic structural view of a housing of a sensor 20 in accordance with another embodiment of the present disclosure. FIG. 6 is an exploded schematic view of the sensor of the embodiment shown in FIG. 5. FIG. 7 is a schematic top view of the housing of the sensor 20 of the another embodiment shown in FIG. 6 or FIG. 5. FIG. 8 is a schematic cross-sectional view of the sensor 20 shown in FIG. 7 along the B-B direction. As shown in FIGS. 5 to 8, the structure of the sensor 20 is the same as that of the sensor 10, which will not be repeated here. The difference is that at least a part of the bottom wall 111 forms a concave wall 103. The first end 1011 of the concave wall 103 is connected to a lower end 1131 of the side wall 113. The concave wall 103 extends from the side wall toward a direction close to the top wall 112. That is, a center of the concave wall 103 is recessed in a direction approaching the top wall 112 relative to an edge of the concave wall 103.

The second channel 151 is closer to the side wall 113 than the center of the concave wall 103. The concave wall 103 is provided with a second channel 151 near the edge of the side wall 113. This arrangement facilitates the discharge of condensed water from the sensor 10.

Figure 9:
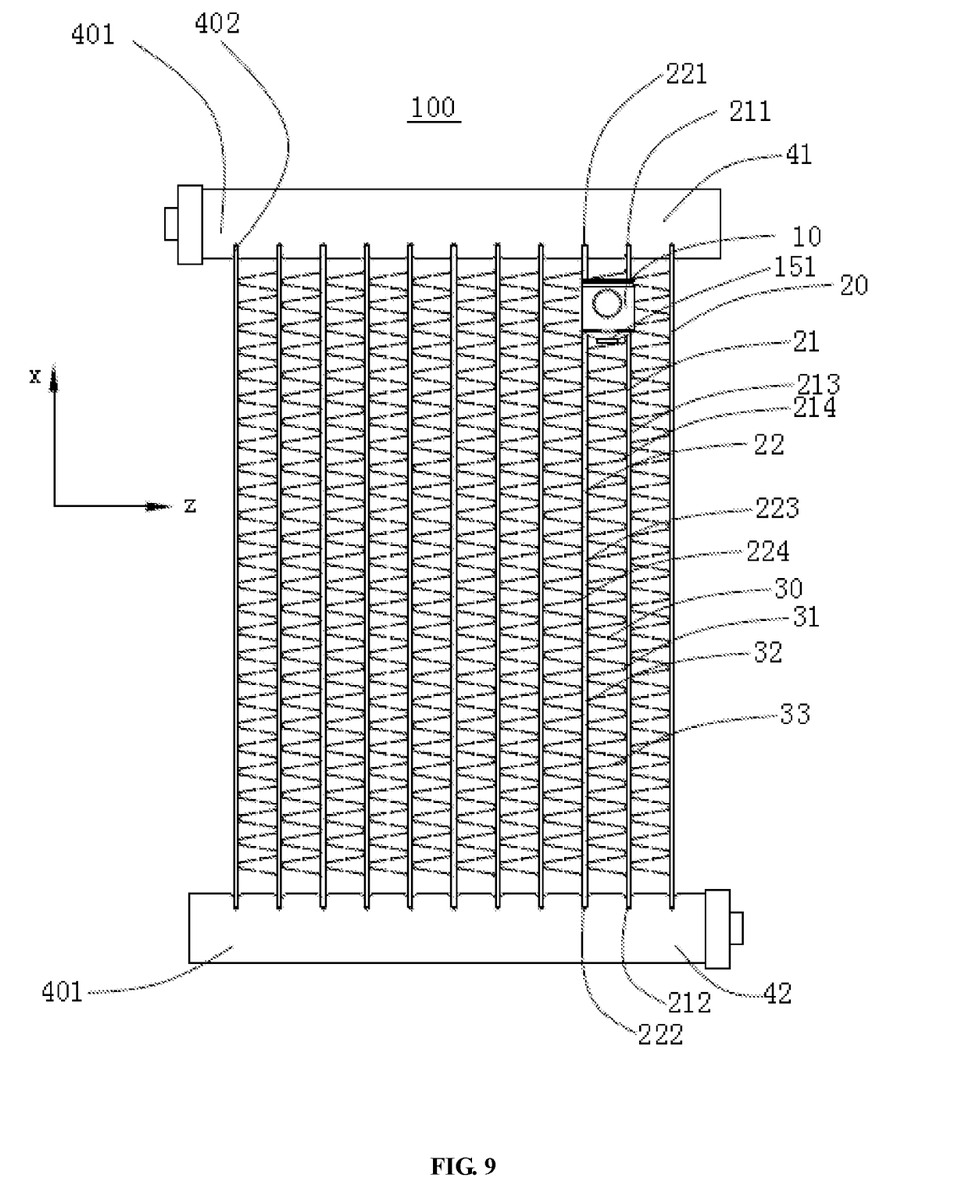
FIG. 9 is a schematic structural view of a heat exchanger provided with a sensor in an embodiment of the present disclosure.

FIG. 9 is a schematic structural view of a heat exchanger 100 having the sensor 10 in accordance with an embodiment of the present disclosure. The heat exchanger 100 is a multi-channel heat exchanger. In some other embodiments, the heat exchanger may also be a tube-fin heat exchanger or other heat exchangers that need to monitor temperature or humidity, etc., which is not limited here. The heat exchanger 100 of an embodiment of the present disclosure may include a collecting pipe, a plurality of heat exchange tubes 20 and fins 30. The collecting pipe has an inner cavity for refrigerant to flow. The shape of the collecting pipe is a circular tube, and a length direction of the collecting pipe is an axial direction. The collecting pipe includes two collecting pipes, namely a first collecting pipe 41 and a second collecting pipe 42. The first collecting pipe 41 and the second collecting pipe 42 are arranged substantially in parallel. It is noted that the heat exchanger 100 and the air generally only undergo heat exchange one time, which is often referred to as a single-layer heat exchanger in the industry. Of course, in some other embodiments, the collecting pipe may also be a D-shaped or square pipe, and its specific shape is not limited, as long as its burst pressure meets the needs of the system. The relative position of the collecting pipe is also not limited, as long as it meets the actual installation requirements. The number of the collecting pipe can also be only one, as long as it meets the heat exchange requirement, which is not limited here. The collecting pipe in the embodiment of the present disclosure is a round pipe as an example.

A plurality of heat exchange tubes 20 are provided. Each of the heat exchange tubes 20 has a length direction, a width direction and a height direction. The plurality of heat exchange tubes 20 are arranged along an axial direction of the collecting pipe and arranged substantially in parallel. Each of the plurality of heat exchange tubes 20 has a first end and a second end. As shown in FIG. 9, the heat exchange tube 20 includes a first heat exchange tube 21 and a second heat exchange tube 22 arranged side by side. The first heat exchange tube 21 has a first end 211 and a second end 212. A direction defining the extension of the first end 211 of the heat exchange tube 21 to the second end 212 is the length direction of the heat exchange tube (the X direction in the drawings). Along the two ends of the heat exchange tube in a thickness direction (the Z direction in the drawings), the heat exchange tube 21 has a first top wall 213 and a first bottom wall 214. The first top wall 213 and the first bottom wall 214 are substantially parallel to each other. The height direction of the heat exchange tube 20 may also be referred to as the thickness direction of the heat exchange tube.

The first end 211 of the first heat exchange tube 21 is connected to the first collecting pipe. The second end 212 of the first heat exchange tube 21 is connected to the second collecting pipe. Similarly, the first end 221 of the second heat exchange tube 22 is connected to the first collecting pipe. The second end 222 of the second heat exchange tube 22 is connected to the second collecting pipe. The first heat exchange tube 21 and the second heat exchange tube 22 are arranged substantially in parallel. The heat exchange tube 20 has an inner channel (not shown in the drawings) for the refrigerant to flow. Such connection makes the inner channel of the heat exchange tube 20 be in fluid communication with the inner cavity of the collecting pipe 40 so as to form a refrigerant flow passage (not shown in the drawings) of the heat exchanger 100. The refrigerant can flow in the heat exchange channel, and the heat exchange can be realized through the heat exchanger 100.

It should be noted that the heat exchange tube 20 is also referred to as a flat tube in the industry, and it has the inner channel for refrigerant to flow inside.

Each of the first collecting pipe 41 and the second collecting pipe 42 has a pipe wall 401, a heat exchange tube insertion hole 402 and an inner cavity (not labeled in the drawings). The axial direction of the first collecting pipe 41 and the second collecting pipe 42 is defined as the length direction of the collecting pipe 10 (i.e., the Z direction in the drawings).

The distribution structure in the embodiment of the present invention is not limited to single-layer heat exchangers, but can also be used in other multi-layer heat exchangers. The multi-layer heat exchanger can be a heat exchanger in which the heat exchange tubes are bent, or a heat exchanger in which adjacent collecting pipes are connected through a connection module. Their structures are roughly the same, so it is not repeated here. It should be noted that when the multi-layer heat exchanger is a heat exchanger with a bent heat exchange tube, the length direction of the heat exchange tube is an extending direction of the heat exchange tube. In other words, the length direction is not limited to a linear direction.

The heat exchanger 100 in the embodiment of the present disclosure includes the fins 30. It is worth noting that the surface of the sensor in the related technology is coated with functional materials, such as corrosion-resistant materials. Specifically, it is coated on all or a part of the outer surface of the entire heat exchanger. The functional material may be a corrosion-resistant material or a moisture-absorbing material, etc., which can be set as required, and will not be repeated here. The fin 30 is a window fin and has a wave crest portion and a wave trough portion. It is noted that, in other embodiments, the fin may also be a non-opening fin. The shape of the fin can be roughly corrugated or profiled. The cross section of the fin can be a sine wave or an approximate sine wave, or a saw-tooth wave, as long as it meets the requirements, and its specific structure is not limited. Of course, the fin 30 can be coated with functional materials as required, which is not limited here.

The fin 30 in the embodiment of the present disclosure is a corrugated fin. The fin 30 has a wave crest portion 31, a wave trough portion 32, and a side wall portion 33 connecting the wave crest portion 31 and the wave trough portion 32. The wave crest portion 31 and the wave trough portion 32 are arranged at intervals in a longitudinal direction of the fin 30. A plurality of side wall portions 33 are provided. It is noted that, the phase "a plurality of" in the present disclosure refers to two and more than two, unless otherwise specified. The side wall portion 33 can be provided with or without windows, which can be provided according to heat exchange requirements.

The fin 30 is arranged between two adjacent heat exchange tubes 20. The wave crest portion 31 is at least partially in contact with the first heat exchange tube 21. The wave trough portion 32 is at least partially in contact with the second heat exchange tube 22. The extending direction of the wave crest portion 31 and the wave trough portion 32 defining the fin 30 at intervals is the length direction of the fin 30 (the X direction in the drawings). It can be found that the length direction of the fin 30 is the same as the length direction of the heat exchange tube 20 (the X direction in the drawings). The distance between the heat exchange tubes 20 is the height direction of the fin 30 (the Z direction in the drawings).

At least a part of the housing of the sensor 10 is inserted into the fin 30 or the gap formed by the fin 30. Specifically, the sensor 10 can be fixed to the fin 30 through the stab portion 16. The stab portion 16 may be clamped on the fin 30. The housing of the sensor 10 is in contact with at least a partial area of the surface of the fin 30 and/or the surface of the heat exchange tube 20. This arrangement is beneficial for the surface temperature of the fin 30 and/or the surface temperature of the heat exchange tube 20 to conduct heat conduction through the metal housing of the sensor 10. As a result, the housing temperature of the sensor 10 is closer to the surface temperature of the heat exchanger 100, and the temperature of the circuit board 12 is also closer to the surface temperature of the heat exchanger 100. Correspondingly, the temperature of the environment where the sensor chip 121 is located is close to the temperature of the heat exchanger 100. In this way, the sensor 10 monitors the temperature and/or humidity near the outer surface of the heat exchanger 100 more accurately.

Referring to FIG. 9, in the length direction of the heat exchange tube 20, one of the first collecting pipe 41 and the second collecting pipe 42 is closer to the sensor 10 than the other of the first collecting pipe 41 and the second collecting pipe 42. Based on the specific placement position of the heat exchanger 100 in the actual application environment and different working conditions, in the length direction of the heat exchanger 20, the temperature at different positions of the heat exchanger 100 may also be different. The initial frosting position of the heat exchanger 100 may be close to one of the two collecting pipes, for example, the frost layer may gradually spread upwardly from the bottom of the heat exchanger. In this way, the sensor 10 is arranged closer to one of the collecting pipes, which is beneficial to combine the actual placement position of the heat exchanger to achieve a better fit to the temperature of the initial frosting position of the heat exchanger. Therefore, it is more accurate to determine whether the heat exchanger is frosted based on the humidity information.

Figure 10:
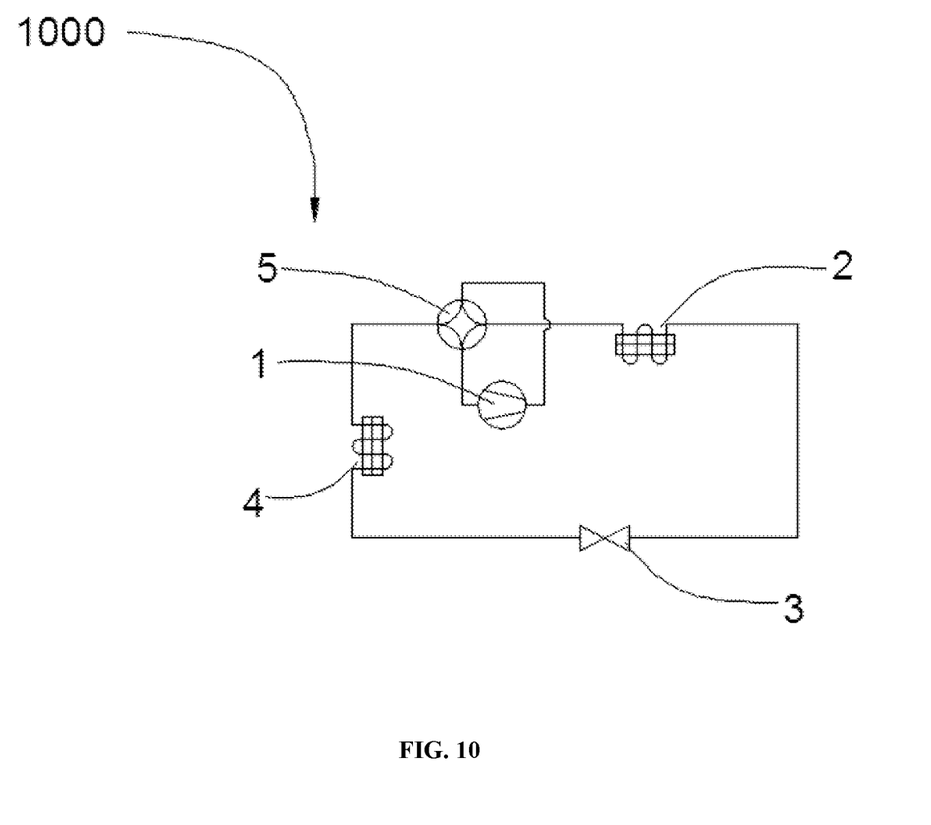
FIG. 10 is a schematic view of an exemplary heat exchange system of the present disclosure.

As shown in FIG. 10, a heat exchange system 1000 is disclosed in an exemplary embodiment of the present disclosure. The heat exchange system 1000 at least includes a compressor 1, a first heat exchanger 2, a throttling device 3, a second heat exchanger 4 and a reversing device 5. Optionally, the compressor 1 of the heat exchange system 1000 may be a horizontal compressor or a vertical compressor. Optionally, the throttling device 3 may be an expansion valve. In addition, the throttling device 3 can also be other components that have the function of reducing pressure and adjusting the flow rate of the refrigerant. The present disclosure does not specifically limit the type of the throttling device, which can be selected according to the actual application environment, and will not be repeated here. It should be noted that in some systems, the reversing device 5 may not be provided. The heat exchanger 100 described in the present disclosure can be used in the heat exchange system 1000 as the first heat exchanger 2 and/or the second heat exchanger 4. In this heat exchange system 1000, the compressor 1 compresses the refrigerant; the temperature of the refrigerant after being compressed rises and then enters the first heat exchanger 2; the refrigerant transfers heat to the outside through the heat exchange between the first heat exchanger 2 and the outside; then, the refrigerant which passing through the throttling device 3 becomes a liquid state or a gas-liquid two-phase state; the temperature of the refrigerant at this time decreases, and then the lower temperature refrigerant flows to the second heat exchanger 4, and enters the compressor 1 again after exchanges heat with the outside in the second heat exchanger 4, so as to realize a circulation of the refrigerant. When the second heat exchanger 4 is used as an outdoor heat exchanger to exchange heat with the air, referring to the above-mentioned embodiment, the heat exchanger is arranged as required.

The above descriptions are only preferred embodiments of the present disclosure, and do not limit the present disclosure in any form. Although the present disclosure has been disclosed as above in preferred embodiments, it is not intended to limit the present disclosure. Those of ordinary skill in the art, without departing from the scope of the technical solution disclosed in the present disclosure, can use the technical content disclosed above to make some changes or modifications into equivalent embodiments with equivalent changes. However, without departing from the content of the technical solutions of the present disclosure, any simple modifications, equivalent changes and modifications made to the above embodiments based on the technical essence of the present disclosure still fall within the scope of the technical solutions of the present disclosure.

What is claimed is:

1. A sensor, comprising: a housing, a circuit board, and a sensor chip fixed on the circuit board;
   wherein a material of the housing is metal, the housing defines a receiving cavity and a first channel extending through the housing, and the first channel is in fluid communication with the receiving cavity and an outside of the sensor;
   wherein the circuit board is at least partially received in the receiving cavity, and at least a part of the circuit board is bonded and fixed to the housing by a thermal conductive glue; and
   wherein the sensor chip is adapted for sensing at least one of a humidity signal and a temperature signal of an environment in the receiving cavity;
   the housing comprises a top wall, a bottom wall, a side wall and a second channel extending through the housing; the side wall is provided on an outer peripheral side of the receiving cavity; the side wall connects the top wall and the bottom wall; at least a part of the bottom wall forms as a concave wall, a center of the concave wall is recessed inwardly relative to an edge of the concave wall toward the top wall, and the second channel is closer to the side wall than the center of the concave wall.

2. The sensor according to claim 1, wherein the material of the housing includes at least one of aluminum, stainless steel and copper; a material of the thermal conductive glue includes at least one of aluminum nitride, boron nitride, silicon nitride, aluminum oxide, magnesium oxide and silicon oxide; and a material of the circuit board includes aluminum nitride and/or aluminum oxide.

3. The sensor according to claim 2, wherein the housing defines a first opening and a second opening, the second channel is formed between the first opening and the second opening, and the second channel is adapted for discharging liquid water out of the housing; and
   wherein the first opening is closer to the receiving cavity than the second opening, and the second opening and the circuit board are located on opposite sides of the first opening, respectively.

4. The sensor according to claim 3,
   wherein the circuit board is fixed to the side wall or to the top wall by the thermal conductive glue, the second channel is provided extending through the bottom wall or the side wall, and the first channel is provided extending through the side wall or the top wall.

5. The sensor according to claim 1, wherein the sensor further defines a third channel, the third channel is capable of being used for a wire to enter and exit, the third channel is provided extending through the side wall or the top wall, and each of the third channel and the first channel is provided at different positions of the side wall of the housing.

6. The sensor according to claim 1, wherein the second channel is one or more of a through hole, a slit or a gap.

7. The sensor according to claim 1, wherein the bottom wall includes an inclined wall and a matching portion, the inclined wall is inclinedly arranged in a direction away from the top wall with respect to a wall thickness direction of the side wall; the matching portion protrudes from an end of the inclined wall in a direction away from the top wall; and the second channel is provided extending through the matching portion.

8. The sensor according to claim 7, wherein at least a part of the inclined wall is connected to a lower end of the side wall, and the second channel is a circular through hole extending through the matching portion.

9. The sensor according to claim 1, wherein the bottom wall comprises an inner surface, an included angle between the inner surface and a wall thickness direction of the side wall is recorded as a first included angle, and the first included angle is greater than or equal to 0° and less than 90°.

10. The sensor according to claim 1, wherein at least a part of the inner surface of the housing is coated with a hydrophilic coating or a hydrophobic coating.

11. The sensor according to claim 1, wherein the sensor chip is an integrated chip integrating a humidity detection function and a temperature detection function.

12. The sensor according to claim 1, wherein the housing of the sensor is further provided with a stab portion extending from the side wall to a side away from the receiving cavity, and a plurality of saw-tooth portions are provided on an outer periphery of the stab portion.

13. A heat exchanger, wherein the heat exchanger comprises a sensor according to claim 1, the heat exchanger includes at least one collecting pipe, a plurality of heat exchange tubes and at least one fin, each one of the plurality of heat exchange tubes is fixed to the collecting pipe, an inner channel of each one of the plurality of heat exchange tubes is in fluid communication with an inner cavity of the collecting pipe, the fin is located between two adjacent heat exchange tubes; and
    wherein the sensor is fixed to the fin, and the housing of the sensor is in contact with at least a part of at least one of a surface of the fin and a surface of the heat exchange tube.

14. The heat exchanger according to claim 13, wherein the heat exchanger includes a first collecting pipe and a second collecting pipe, the heat exchange tube includes a first end and a second end located at opposite ends of the heat exchange tube in a length direction, the first end is connected to the first collecting pipe, the second end is connected to the second collecting pipe, the inner channel of each one of the plurality of heat exchange tubes is in fluid communication with an inner cavity of the first collecting pipe and an inner cavity of the second collecting pipe; and
    wherein in the length direction of the heat exchange tube, one of the first collecting pipe and the second collecting pipe is closer to the sensor than the other of the first collecting pipe and the second collecting pipe.

15. A sensor, comprising:
    a housing defining a receiving cavity, a first channel and a second channel, the first channel being in fluid communication with the receiving cavity, the first channel being adapted for air entering in the receiving cavity or leaving from the receiving cavity, the second channel being in fluid communication with the receiving cavity, and the second channel being adapted for discharging liquid water out of the housing;
    a circuit board being at least partially received in the receiving cavity, the circuit board being fixed to the housing, the circuit board being disposed above the second channel in a top-to-bottom direction; and
    a sensor chip being fixed on the circuit board, the sensor chip being adapted for sensing at least one of a humidity signal and a temperature signal of an environment in the receiving cavity;

wherein each of the first channel and the second channel is provided at different positions of the housing, and the second channel is closer to a bottom of the sensor than the first channel in the top-to-bottom direction;

a material of the housing is metal;

at least a part of the circuit board is bonded and fixed to the housing through a thermal conductive glue;

the housing further comprises a top wall, a bottom wall, a side wall and a second channel extending through the housing; the side wall is provided on an outer peripheral side of the receiving cavity; the side wall connects the top wall and the bottom wall; at least a part of the bottom wall forms as a concave wall, a center of the concave wall is recessed inwardly relative to an edge of the concave wall toward the top wall, and the second channel is closer to the side wall than the center of the concave wall.

16. The sensor according to claim 15, wherein the top wall and the bottom wall are located at opposite ends in the top-to-bottom direction; wherein the first channel is provided at least of the side wall or the top wall and extends therethrough, and the second channel is provided at the bottom wall and extends therethrough.

17. The sensor according to claim 16, wherein at least a part of the circuit board is fixed to the top wall through a glue, the second channel is located below the circuit board, and a thickness direction of the circuit board is co-directional with an axial direction of the second channel.

18. The sensor according to claim 17, wherein the bottom wall extends from the side wall to a direction away from the top wall, the bottom wall is funnel-shaped.

19. The sensor according to claim 17, further defining a third channel, the third channel being used for a wire to go therethrough, both of the third channel and the second channel being provided at the side wall and extending therethrough, and the third channel and the second channel being disposed at two opposite sides of the side wall.

* * * * *